(12) United States Patent
Smaragdis et al.

(10) Patent No.: US 8,965,832 B2
(45) Date of Patent: Feb. 24, 2015

(54) FEATURE ESTIMATION IN SOUND SOURCES

(75) Inventors: Paris Smaragdis, Urbana, IL (US); Gautham J. Mysore, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 392 days.

(21) Appl. No.: 13/408,941

(22) Filed: Feb. 29, 2012

(65) Prior Publication Data

US 2013/0226858 A1    Aug. 29, 2013

(51) Int. Cl.
*G06F 9/44*    (2006.01)

(52) U.S. Cl.
USPC ........................................... 706/52; 381/94.1

(58) Field of Classification Search
USPC ......................................................... 706/52
See application file for complete search history.

(56) References Cited

U.S. PATENT DOCUMENTS

| | | | |
|---|---|---|---|
| 5,038,658 A | 8/1991 | Tsuruta et al. | |
| 7,318,005 B1 | 1/2008 | Smaragdis et al. | |
| 7,480,640 B1 | 1/2009 | Elad et al. | |
| 7,507,899 B2 | 3/2009 | Sumita | |
| 7,754,958 B2 | 7/2010 | Goto et al. | |
| 7,982,119 B2 | 7/2011 | Taub et al. | |
| 8,060,512 B2 | 11/2011 | Peng | |
| 8,380,331 B1 | 2/2013 | Smaragdis et al. | |
| 2003/0028374 A1* | 2/2003 | Ribic | 704/233 |
| 2003/0088401 A1 | 5/2003 | Terez | |
| 2004/0071363 A1 | 4/2004 | Kouri et al. | |
| 2006/0015263 A1 | 1/2006 | Stupp et al. | |
| 2006/0050898 A1 | 3/2006 | Yamada et al. | |
| 2006/0065107 A1 | 3/2006 | Kosonen | |
| 2008/0010038 A1 | 1/2008 | Smaragdis et al. | |
| 2008/0097754 A1 | 4/2008 | Goto et al. | |
| 2008/0210082 A1 | 9/2008 | Sumita | |
| 2008/0222734 A1 | 9/2008 | Redlich et al. | |
| 2008/0312913 A1 | 12/2008 | Goto | |
| 2009/0119097 A1 | 5/2009 | Master et al. | |
| 2010/0131086 A1 | 5/2010 | Itoyama et al. | |
| 2011/0035215 A1 | 2/2011 | Sompolinsky et al. | |
| 2011/0282658 A1* | 11/2011 | Wang et al. | 704/208 |
| 2013/0132082 A1* | 5/2013 | Smaragdis | 704/240 |

OTHER PUBLICATIONS

Mysore, G., P. Smaragdis, and B. Raj. 2010. Non-negative hidden Markov modeling of audio with application to source separation. In 9th international conference on Latent Variable Analysis and Signal Separation (LCA/ICA). St. Malo, France. Sep. 2010.*

Smaragdis, P. and B. Raj. 2010. The Markov selection model for concurrent speech recognition. In IEEE international workshop on Machine Learning for Signal Processing (MLSP). Aug. 2010, Kittilä, Finland.*

"Final Office Action", U.S. Appl. No. 12/261,931, (Jun. 28, 2012), 15 pages.

(Continued)

*Primary Examiner* — Jeffrey A Gaffin
*Assistant Examiner* — David H Kim
(74) *Attorney, Agent, or Firm* — Wolfe-SBMC (57) ABSTRACT

A sound mixture may be received that includes a plurality of sources. A model may be received for one of the source that includes a dictionary of spectral basis vectors corresponding to that one source. At least one feature of the one source in the sound mixture may be estimated based on the model. In some examples, the estimation may be constrained according to temporal data.

20 Claims, 5 Drawing Sheets

(56) References Cited

OTHER PUBLICATIONS

"Non-Final Office Action", U.S. Appl. No. 12/261,931, (Jan. 11, 2012), 12 pages.

"Notice of Allowance", U.S. Appl. No. 12/261,931, (Oct. 17, 2012), 4 pages.

"Restriction Requirement", U.S. Appl. No. 12/261,931, (Sep. 27, 2011), 6 pages.

Ozgur Izmirli, et al., "A Multiple Fundamental Frequency Tracking Algorithm," 5 pages, 1996.

A. Klapuri, "Multipitch Analysis of Polyphonic Music and Speech Signals Using an Auditory Model," IEEE Trans. Audio, Speech and Language Processing, vol. 16, pp. 255-266, Feb. 2008.

Kedem, B, "Spectral Analysis and Discrimination by Zero-Crossings," Proceedings of the IEEE, Nov. 1986, 17 pages.

Moorer, J.A., "On the Transcription of Musical Sound by Computer," Computer Music Journal, vol. 1, No. 4, Nov. 1977, pp. 32-38.

D. Ellis, Prediction-Driven Computational Auditory Scene Analysis. PhD thesis, M.I.T., 1996, 180 pages.

M. Goto, "A real-time music-scene-description system: predominant-f0 estimation for detecting melody and bass lines in real-world audio signals," Speech Communication, vol. 43, No. 4, pp. 311-329, 2004.

A. T. Cemgil, H. J. Kappen, and D. Barber, "A Generative Model for Music Transcription," IEEE Trans. Audio, Speech and Language Processing, vol. 14, pp. 679-694, Mar. 2006.

J. C. Brown, "Calculation of a constant Q spectral transform," Journal of the Acoustical Society of America, vol. 89, Jan. 1991, 10 pages.

P. Smaragdis, B. Raj, and M. V. Shashanka, "Sparse and Shift-Invariant Feature Extraction From Non-Negative Data," in Proceedings IEEE International Conference on Audio and Speech Signal Processing, Apr. 2008, 4 pages.

Brown, J.C. "Musical fundamental frequency tracking using a pattern recognition method," in Journal of the Acoustical Society of America, vol. 92, No. 3, pp. 1394-1402, 1992.

Cheveigne, A. and H. Kawahara. "Yin, a fundamental frequency estimator for speech and music," in Journal of the Acoustical Society of America, 111(4). 2002, 14 pages.

Doval, B. and Rodet, X. 1991. "Estimation of Fundamental Frequency of Musical Sound Signals," in International Conference on Acoustics, Speech and Signal Processing, pp. 3657-3660.

Goto, M. 2000. "A Robust Predominant-F0 Estimation Method for Real-Time Detection of Melody and Bass Lines in CD Recordings," in Proceedings IEEE International Conference on Acoustics, Speech, and Signal Processing, Istanbul, Turkey, Jun. 2000, 4 pages.

Klapuri, A. P. 1999. "Wide-band pitch estimation for natural sound sources with inharmonicities," in Proc. 106th Audio Engineering Society Convention, Munich, Germany, 1999, 11 pages.

Dempster, A.P, N.M. Laird, D.B. Rubin, 1977. "Maximum Likelihood from Incomplete Data via the EM Algorithm" Journal of the Royal Statistical Society, B, 39, 1-38. 1977.

Brand, M.E.. "Structure learning in conditional probability models via an entropic prior and parameter extinction," Neural Computation. 1999, 27 pages.

Shashanka, M.V., B. Raj, and P. Smaragdis. "Sparse Overcomplete Latent Variable Decomposition of Counts Data," in Neural Information Processing Systems, Dec. 2007, 8 pages.

Corless, R.M., et al., "On the Lambert W Function," Advances in Computational Mathematics, vol. 5, 1996, pp. 329-359.

U.S. Appl. No. 12/261,931, filed Oct. 30, 2008, Adobe Systems Incorporated, all pages.

Klapuri, A. Signal Processing Methods for the Automatic Transcription of Music, Doctoral Dissertation, Tampere University of Technology, Finland 2004, 179 pages.

Smaragdis, P. Approximate nearest-subspace representations for sound mixtures, in proc. ICASSP 2011, 4 pages.

Smaragdis, P. 2011 Polyphonic Pitch Tracking by Example, in proceedings of the IEEE Workshop on Applications of Signal Processing to Audio and Acoustics (WASPAA), New Paltz, NY 2011, 4 pages.

Shashanka, M.V.S. 2007. Latent Variable Framework for Modeling and Separating Single Channel Acoustic Sources. Department of Cognitive and Neural Systems, Boston University, Aug. 2007, 66 pages.

Smaragdis, P., M. Shashanka, and B. Raj. 2009. A sparse nonparametric approach for single channel separation of known sounds. In Neural Information Processing Systems. Vancouver, BC, Canada. Dec. 2009, 9 pages.

Smaragdis, P. Raj, B. and Shashanka, M.V. 2007. Supervised and Semi-Supervised Separation of Sounds from Single-Channel Mixtures. In proceedings of the 7th International Conference on Independent Component Analysis and Signal Separation. London, UK. Sep. 2007, 8 pages.

* cited by examiner

FIG. 5C ns, according to some
FEATURE ESTIMATION IN SOUND SOURCES

BACKGROUND

For humans, understanding musical sources and being able to detect and transcribe them when observed inside a mixture is a learned process. Through repetitive ear training exercises, we learn to associate sounds with specific instruments and notes (e.g., pitch and/or volume), and eventually we develop the ability to understand music using such terms. The computerized counterpart of this approach, however, is not as developed.

SUMMARY

This disclosure describes techniques and structures for estimating features of a sound mixture. In one embodiment, a sound mixture may be received that includes a plurality of sources. A model may be received for one source of the plurality of sources. The model may include a dictionary of spectral basis vectors corresponding to the one source. At least one feature (e.g., pitch) may then be estimated for the one source in the sound mixture based on the model. Such estimation may occur for each time frame of the sound mixture. In some examples, such feature estimation may be constrained according to a constraint based on temporal data.

In one non-limiting embodiment, the received model may be based on isolated training data of the one source. In one embodiment, the spectral basis vectors may be normalized spectra from the isolated training data. The isolated training data may also be feature tagged (e.g., pitch tagged) such that each of the dictionary's spectral basis vectors has an associated feature value. Additionally, the estimates may be constrained according to a constraint based on temporal data. One example of the constraint is a semantic continuity constraint that may be a limit on a difference in the estimated feature in successive time frames in the sound mixture.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. The headings used herein are for organizational purposes only and are not meant to be used to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

"First," "Second," etc. As used herein, these terms are used as labels for nouns that they precede, and do not imply any type of ordering (e.g., spatial, temporal, logical, etc.). For example, for a signal analysis module estimating a feature of a source of a plurality of sources in a sound mixture based on a model of the source, the terms "first" and "second" sources can be used to refer to any two of the plurality of sources. In other words, the "first" and "second" sources are not limited to logical sources 0 and 1.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

"Signal." Throughout the specification, the term "signal" may refer to a physical signal (e.g., an acoustic signal) and/or to a representation of a physical signal (e.g., an electromagnetic signal representing an acoustic signal). In some embodiments, a signal may be recorded in any suitable medium and in any suitable format. For example, a physical signal may be digitized, recorded, and stored in computer memory. The recorded signal may be compressed with commonly used compression algorithms. Typical formats for music or audio files may include WAV, OGG, AIFF, RAW, AU, AAC, MP4, MP3, WMA, RA, etc.

"Source." The term "source" refers to any entity (or type of entity) that may be appropriately modeled as such. For example, a source may be an entity that produces, interacts with, or is otherwise capable of producing or interacting with a signal. In acoustics, for example, a source may be a musical instrument, a person's vocal cords, a machine, etc. In some cases, each source—e.g., a guitar—may be modeled as a plurality of individual sources—e.g., each string of the guitar may be a source. In other cases, entities that are not otherwise capable of producing a signal but instead reflect, refract, or otherwise interact with a signal may be modeled as a source—e.g., a wall or enclosure. Moreover, in some cases two different entities of the same type—e.g., two different pianos—may be considered to be the same "source" for modeling purposes.

"Mixed signal," "Sound mixture." The terms "mixed signal" or "sound mixture" refer to a signal that results from a combination of signals originated from two or more sources into a lesser number of channels. For example, most modern music includes parts played by different musicians with different instruments. Ordinarily, each instrument or part may be recorded in an individual channel. Later, these recording channels are often mixed down to only one (mono) or two (stereo) channels. If each instrument were modeled as a source, then the resulting signal would be considered to be a mixed signal. It should be noted that a mixed signal need not be recorded, but may instead be a "live" signal, for example, from a live musical performance or the like. Moreover, in some cases, even so-called "single sources" may be modeled as producing a "mixed signal" as mixture of sound and noise.

Introduction

This specification first presents an illustrative computer system or device, as well as an illustrative signal analysis module that may implement certain embodiments of methods disclosed herein. The specification then discloses techniques for estimating a feature (e.g., pitch, volume, etc.) of a source of a sound mixture. Various examples and applications are also disclosed. Some of these techniques may be implemented, for example, by a signal analysis module or computer system.

In some embodiments, these techniques may be used in polyphonic transcription, polyphonic pitch and/or volume tracking, music recording and processing, source separation, source extraction, noise reduction, teaching, automatic transcription, electronic games, audio search and retrieval, video search and retrieval, audio and/or video organization, and many other applications. As one non-limiting example, the techniques may allow for tracking the pitch and/or volume of a musical source in a sound mixture. Although much of the disclosure describes feature estimation in sound mixtures, the disclosed techniques may apply equally to single sources. Although certain embodiments and applications discussed herein are in the field of audio, it should be noted that the same or similar principles may also be applied in other fields.

Example System

Figure 1:
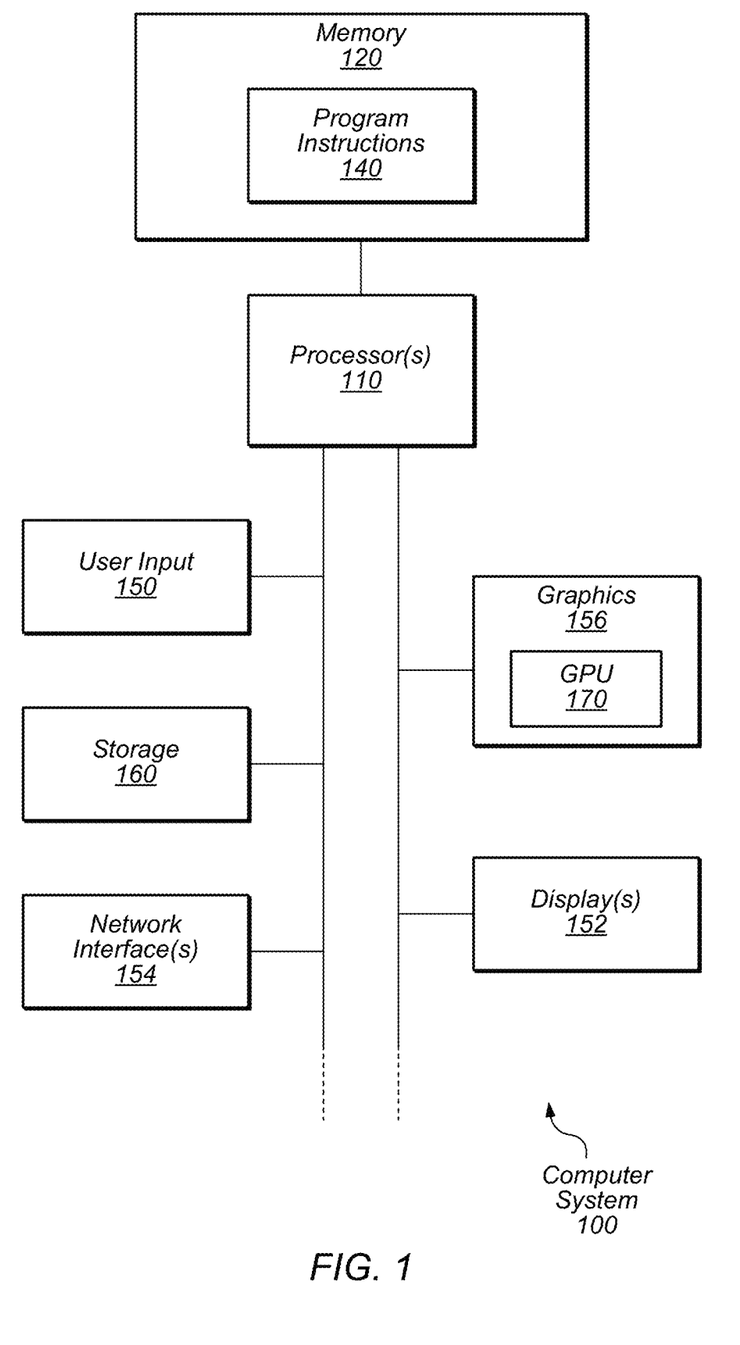
FIG. 1 is a block diagram of an illustrative computer system or device configured to implement some embodiments.

FIG. 1 is a block diagram showing elements of an illustrative computer system 100 that is configured to implement embodiments of the systems and methods described herein. The computer system 100 may include one or more processors 110 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 100, such as various versions of Unix, Linux, Windows® from Microsoft Corporation, MacOS® from Apple Inc., or any other operating system that enables the operation of software on a hardware platform. The processor(s) 110 may be coupled to one or more of the other illustrated components, such as a memory 120, by at least one communications bus.

In some embodiments, a specialized graphics card or other graphics component 156 may be coupled to the processor(s) 110. The graphics component 156 may include a graphics processing unit (GPU) 170, which in some embodiments may be used to perform at least a portion of the techniques described below. Additionally, the computer system 100 may include one or more imaging devices 152. The one or more imaging devices 152 may include various types of raster-based imaging devices such as monitors and printers. In an embodiment, one or more display devices 152 may be coupled to the graphics component 156 for display of data provided by the graphics component 156.

In some embodiments, program instructions 140 that may be executable by the processor(s) 110 to implement aspects of the techniques described herein may be partly or fully resident within the memory 120 at the computer system 100 at any point in time. The memory 120 may be implemented using any appropriate medium such as any of various types of ROM or RAM (e.g., DRAM, SDRAM, RDRAM, SRAM, etc.), or combinations thereof. The program instructions may also be stored on a storage device 160 accessible from the processor(s) 110. Any of a variety of storage devices 160 may be used to store the program instructions 140 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage device 160 may be coupled to the processor(s) 110 through one or more storage or I/O interfaces. In some embodiments, the program instructions 140 may be provided to the computer system 100 via any suitable computer-readable storage medium including the memory 120 and storage devices 160 described above.

The computer system 100 may also include one or more additional I/O interfaces, such as interfaces for one or more user input devices 150. In addition, the computer system 100 may include one or more network interfaces 154 providing access to a network. It should be noted that one or more components of the computer system 100 may be located remotely and accessed via the network. The program instructions may be implemented in various embodiments using any desired programming language, scripting language, or combination of programming languages and/or scripting languages, e.g., C, C++, C#, Java™, Perl, etc. The computer system 100 may also include numerous elements not shown in FIG. 1, as illustrated by the ellipsis.

A Signal Analysis Module

Figure 2:
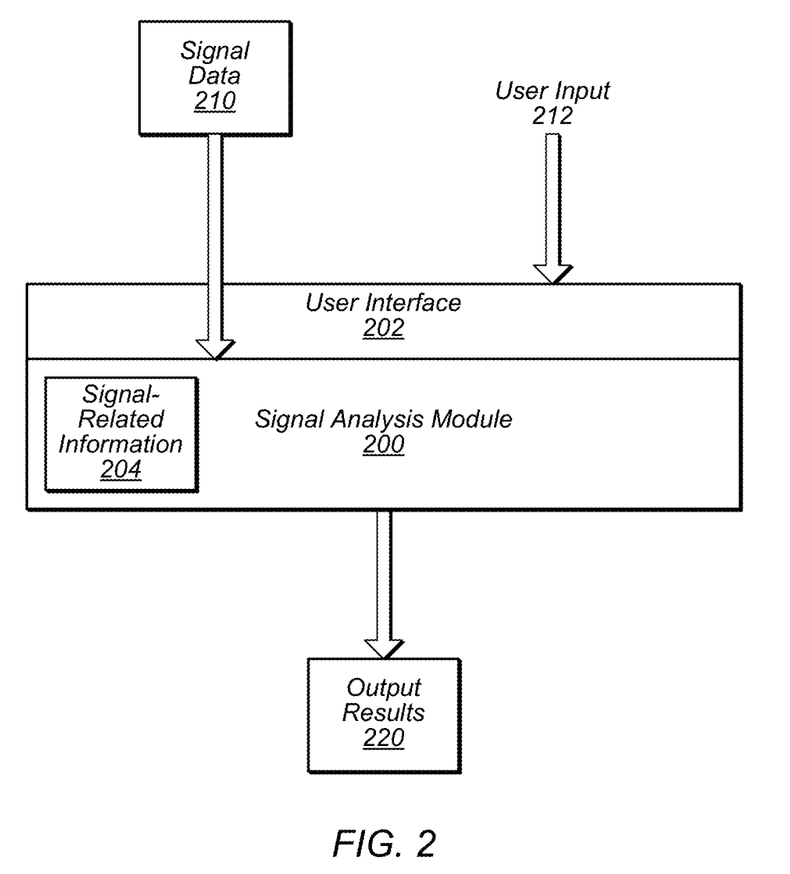
FIG. 2 is a block diagram of an illustrative signal analysis module, according to some embodiments.

In some embodiments, a signal analysis module may be implemented by processor-executable instructions (e.g., instructions 140) stored on a medium such as memory 120 and/or storage device 160. FIG. 2 shows an illustrative signal analysis module that may implement certain embodiments disclosed herein. In some embodiments, module 200 may provide a user interface 202 that includes one or more user interface elements via which a user may initiate, interact with, direct, and/or control the method performed by module 200. Module 200 may be operable to obtain digital signal data for a digital signal 210, receive user input 212 regarding the signal data, analyze the signal data and/or the input, and output analysis results 220 for the signal data 210. In an embodiment, the module may include or have access to additional or auxiliary signal-related information 204—e.g., a collection of representative signals, model parameters, etc. Output analysis results 220 may include a feature (e.g., pitch, volume) of one or more of the constituent sources of signal data 210.

Signal analysis module 200 may be implemented as or in a stand-alone application or as a module of or plug-in for a signal processing application. Examples of types of applications in which embodiments of module 200 may be implemented may include, but are not limited to, pitch tracking, signal (including sound) analysis, characterization, search, processing, and/or presentation applications, as well as applications in security or defense, educational, scientific, medical, publishing, broadcasting, entertainment, media, imaging, acoustic, oil and gas exploration, and/or other applications in which signal analysis, characterization, representation, or presentation may be performed. Module 200 may also be used to display, manipulate, modify, classify, and/or store signals, for example to a memory medium such as a storage device or storage medium.

Figure 3:
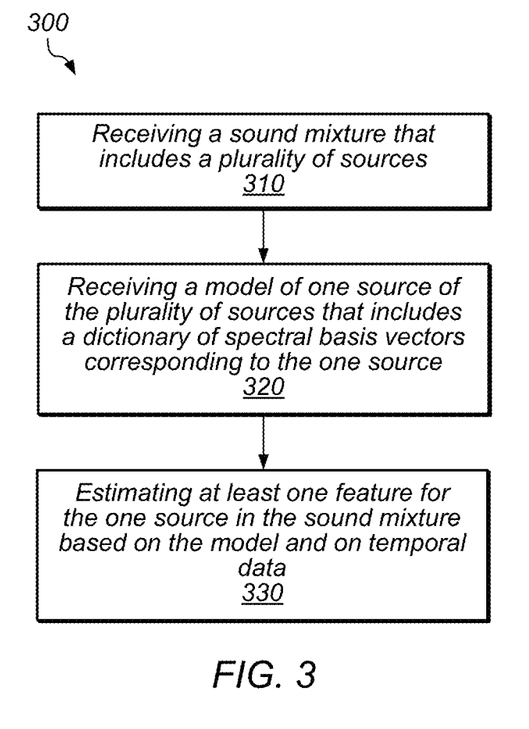
FIG. 3 is a flowchart of a method for feature estimation of a source of a sound mixture, according to some embodiments.

Turning now to FIG. 3, one embodiment of estimating a feature of a source of a sound mixture is illustrated. While the blocks are shown in a particular order for ease of understanding, other orders may be used. In some embodiments, method 300 of FIG. 3 may include additional (or fewer) blocks than shown. Blocks 310-330 may be performed automatically, may receive user input, or may use a combination thereof. In some embodiments, one or more of blocks 310-330 may be performed by signal analysis module 200 of FIG. 2.

As illustrated at 310, a sound mixture that includes a plurality of sound sources may be received. Example classes of sound sources may include: speech, music (e.g., singing and/or instruments), etc. Accordingly, examples of sound mixtures may include: singing and one or more musical instruments, or one or more musical instruments, etc. In some examples, each source (e.g., a guitar) may be modeled as a plurality of individual sources, such as each string of the guitar being modeled as a source. In various embodiments, the sound class(es) that may be analyzed in method 300 may be pre-specified. For instance, in some embodiments, method 300 may only perform feature estimation on a source that has been pre-specified. Sources may be pre-specified, for example, based on received user input. Or, a source that is pre-specified may correspond to which source of the plurality of sound sources has isolated training data available, the isolated training data upon which a model may be based, as described at block 320. In other embodiments, the sources may not be pre-specified.

The received sound mixture may be in the form of a spectrogram of signals emitted by the respective sources corresponding to each of the plurality of sound classes. In other scenarios, a time-domain signal may be received and processed to produce a time-frequency representation or spectrogram. In some embodiments, the spectrograms may be spectrograms generated, for example, as the magnitudes of the short time Fourier transform (STFT) of the signals. The signals may be previously recorded or may be portions of live signals received at signal analysis module 200. Note that not all sound sources of the received sound mixture may be present at one time (e.g., in one frame). For example, in one time frame, singing and guitar sounds may be present while, at another time, only the guitar sounds (or some other musical instrument) may be present. In an alternative embodiment, a single sound source may be received at 310 instead of a sound mixture. An example may be a signal of a flute playing a sequence of notes.

As shown at 320, a model may be received for one of the plurality of sources. The model may include a dictionary of spectral basis vectors corresponding to the one source. In one embodiment, the model may be based on isolated training data of the one source. For example, as described herein, the isolated training data may be used directly as the spectral basis vectors (e.g., in the form of normalized spectra from the isolated training data). As another example, the isolated training data may be modeled by PLCA or similar algorithms to generate spectral basis vectors for the one source. The isolated training data may be pitch tagged such that each of the spectral basis vectors has an associated pitch value.

In some embodiments, a model may be received for one of the plurality of sources without receiving models for any remaining source(s) of the plurality of sources. In other embodiments, models may also be received for other source(s) of the plurality of sound sources but in some embodiments, at least one of the sources is unknown. An unknown source refers to a source that has no training data associated with it that is used to generate a model and/or estimate features at block 330. Thus, as an example, if the sound mixture includes four sources, model(s) for one, two, or three of the sources may be received at 320. In embodiments in which models for more than one source are received, the multiple models may be received as a single composite model. In one embodiment, the model(s) may be generated by signal analysis module 200, and may include generating a spectrogram for each respective source that is modeled. In other embodiments, another component, which may be from a different computer system, may generate the model(s). Yet in other embodiments, the model(s) may be received as user input. The spectrogram of a given sound class may be viewed as a histogram of sound quanta across time and frequency. Each column of a spectrogram may be the magnitude of the Fourier transform over a fixed window of an audio signal. As such, each column may describe the spectral content for a given time frame (e.g., 50 ms, 100 ms, 150 ms, etc.). In some embodiments, the spectrogram may be modeled as a linear combination of spectral vectors from a dictionary using a factorization method.

The model(s) may include the spectral structure and/or temporal dynamics of a given source, or sound class. As described herein, the sound classes for which models are received may be pre-specified. Moreover, in generating the model(s), isolated training data for each sound class may be used. The training data may be obtained and/or processed at a different time than blocks 310-330 of method 300. For instance, the training data may, in some instances, be prerecorded. Given the training data, a model may be generated for that sound class. A small amount of training data may generalize well for some sound classes whereas for others, it may not. Accordingly, the amount of training data used to generate a model may vary from class to class. For instance, the amount of training data to model a guitar may be different than the amount to model a trumpet. Moreover, the size of the respective model may likewise vary from class to class. In one embodiment, the training data may be directly used as the dictionary elements. In some embodiments, receiving the training data for one or more sources and/or generating the model(s) may be performed as part of method 300.

Each model may include a dictionary of spectral basis vectors and, in some embodiments, feature-tagged information (e.g., pitch values) associated with the spectral basis vectors. In an embodiment in which multiple sound classes are modeled, each of respective models may be combined into a composite model, which may be received at 320. The composite model may include a composite dictionary that includes the dictionary elements (e.g., spectral basis vectors) and corresponding feature information from each of the respective dictionaries. For example, the dictionary elements and feature information may be concatenated together into the single composite dictionary. If a first dictionary, corresponding to source 1, has 15 basis vectors and a second dictionary, corresponding to source 2, has 15 basis vectors, the composite dictionary may have 30 basis vectors, corresponding to those from each of the first and secondary dictionaries.

Each dictionary may include a plurality of spectral components of the spectrogram. For example, the dictionary may include a number of basis vectors (e.g., 1, 3, 8, 12, 15, etc.). Each segment of the spectrogram may be represented by a linear combination of spectral components of the dictionary. The spectral basis vectors and a set of weights may be estimated using a source separation technique. Example source separation techniques include probabilistic latent component analysis (PLCA), non-negative hidden Markov model (N-HMM), and non-negative factorial hidden Markov model (N-FHMM). For additional details on the N-HMM and N-FHMM algorithms, see U.S. patent application Ser. No. 13/031,357, filed Feb. 21, 2011, entitled "Systems and Methods for Non-Negative Hidden Markov Modeling of Signals", which is hereby incorporated by reference. Moreover, in some cases, each source may include multiple dictionaries. As a result of the generated dictionary, the training data may be explained as a linear combination of the basis vectors of the dictionary.

In some embodiments, the training data may be pitch tagged such that each of the spectral basic basis vectors of the dictionary of spectral basis vectors may include an associated pitch value. As an example, for a dictionary having four spectral basis vectors, the first basis vector may have a first pitch value (e.g., 400 Hz) associated with it, the second basis vector a second pitch value (e.g., 425 Hz), and so on. Note that use of the terms first and second pitch are simply labels to denote which basis vector they are associated with. It does not necessarily mean that they are different. In some instances, the first and second pitch may actually be the same pitch whereas in other instances, they may be different. The tagging of the training data may be performed as part of method 300, by signal analysis module 200 or some other component, or it may be performed elsewhere. In some embodiments, tagging may be performed automatically by signal analysis module. In other embodiments, tagging may be performed manually (e.g., by user input 212). While method 300 is described in terms of pitch and/or volume tracking/estimation, other features of the sound mixture may likewise be tracked. Accordingly, training data may be feature tagged with something other than pitch values. As described at 330, the feature-tagged data may enable the estimation to infer temporal information regarding the training data. Note that in some embodiments, the training data may not be feature tagged.

Probabilistic decomposition of sources may be used as part of method 300. In some embodiments, normalized magnitude spectra may be decomposed into a set of overcomplete dictionary elements and their corresponding weights. This can be interpreted as non-negative factorizations or as latent probabilistic models. For a sound s(t), its time-frequency transform may be:

$$S_t(f)=F[s(t,\ldots,t+N-1)].\qquad\text{Eq. (1)}$$

The transform F(.) may be a Fourier transform with the appropriate use of a tapering window to minimize spectral leakage. The use of alternative transforms (e.g., constant-Q or warped Fourier transforms) is also possible.

In one embodiment, to help obtain invariance from phase and scale changes, just the magnitude of the time-frequency transform may be retained. All its time frames may be normalized such that they sum to a constant value (e.g., 1):

$$\hat{S}_t(f) = \frac{\|S_t(f)\|}{\sum_f \|S_t(f)\|}\qquad\text{Eq. (2)}$$

Figure 4A:
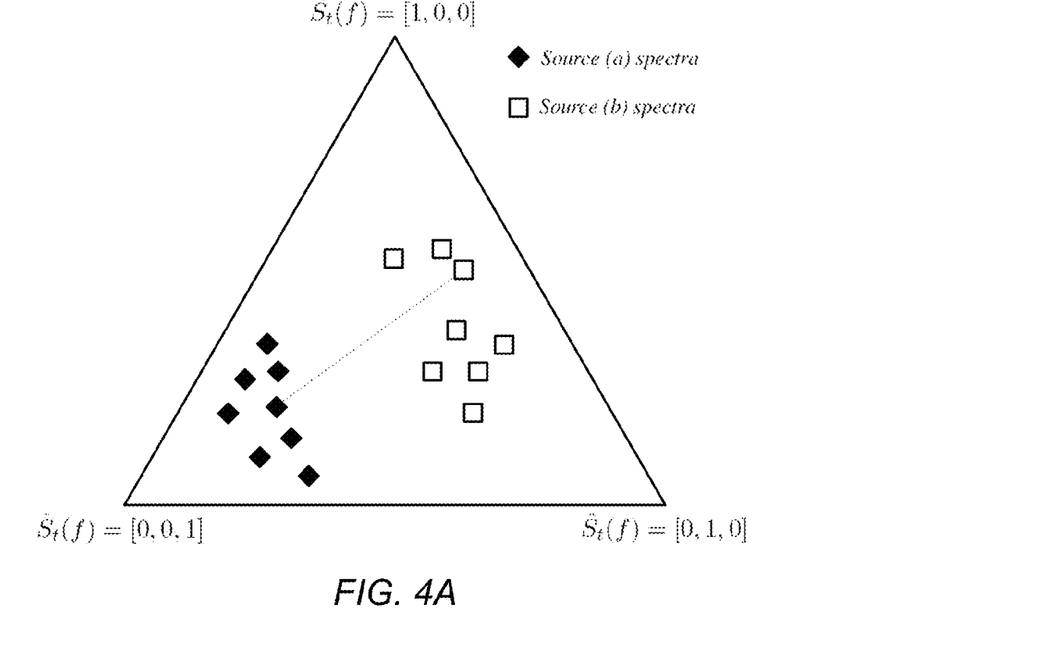
FIG. 4A illustrates an example of normalized spectra of three frequencies from two sources, according to some embodiments.

By analyzing a sound using this process, a set of normalized magnitude spectra is produced that describes its observable spectral configurations. In some embodiments, the set of normalized magnitude spectra may be used directly as the dictionary elements (e.g., spectral basis vectors) of the source. It is convenient for explanatory purposes to represent this space of spectra inside a simplex, a space that may contain the set of possible normalized spectra. For most sounds, their constituent normalized spectra will occupy a subspace of that simplex, an area that defines their timbral characteristics. A simple example with normalized spectra of only three frequencies from two sources is shown in FIG. 4A. In general, dissimilar sources may occupy different parts of that space. The line defined by connecting any two spectra (e.g., the dotted line in the space of FIG. 4A) may contain the possible normalized spectra that a mixture of those two spectra can generate. A convenient feature of this representation is that whenever two normalized spectra mix, the resulting normalized spectrum will lie on the line that connects the original spectra. To aid the subsequent inference task, it is also helpful to think of the normalized spectra as being probability distributions of energy across frequencies. Using that interpretation, the probability of frequency f at time frame t is $P_t(f)=\hat{S}_t(f)$.

Turning back to FIG. 3, a probabilistic model that can analyze mixtures based on prior learning where source examples are used may be defined as follows:

$$P_t(f) \approx P_t(a)\sum_z P^{(a)}(f\mid z)P_t^{(a)}(z) + P_t(b)\sum_z P^{(b)}(f\mid z)P_t^{(b)}(z).\qquad\text{Eq. (3)}$$

The spectral probabilities $P_t(f)$ may be the measurements that are made by observing a mixture of two sound classes. They may represent the probability of observing energy at time t and frequency f. This is then approximated as a weighted sum of a set of dictionary elements $P^{(a)}(f\mid z)$ and $P^{(b)}(f\mid z)$. These dictionary elements can be learned from training examples for the two sound classes (a) and (b). Or, as described herein, training data may not be available for at least one source of a sound mixture such that the dictionary elements of the unknown source may not be learned from a training example. The two sets of weights, $P_t^{(a)}(z)$ and $P_t^{(b)}(z)$, combined with the source priors, $P_t(a)$ and $P_t(b)$, may regulate how the dictionary elements are to be combined to approximate the observed input. The above probabilities may be discrete and contain a finite number of elements. The latent variable z may serve as an index for addressing the dictionary elements. The parameters of the model may be learned using the Expectation-Maximization algorithm.

In one embodiment, the dictionary elements may be assigned as the training data and a sparsity prior may be used to perform an overcomplete decomposition. Thus, dictionaries may not need to be learned and the following may be set as $P^{(a)}(f|z) \equiv \hat{S}_z^{(a)}(f)$ and $P^{(b)}(f|z) \equiv \hat{S}_z^{(b)}(f)$, where, $\hat{S}_z^{(a)}$ and $\hat{S}_z^{(b)}$ are the normalized spectra that are obtained from the training data for sources (a) and/or (b). Note that in a simple case, training data may just be available for a single source (a) but not for source (b), which may be unknown. For each observed mixture point $P_t(f)$ in the normalized spectra simplex, one dictionary element may be found from each of the two sources such that the observation lies on the line that connects the two elements. Note that this model may also resolve mixtures having more than two sources. For example, each source may be modeled with its own dictionary and Equation (3) may be extended to have more than two terms. Or, more than two sources may be defined as two sources, with one being the target source (e.g., a singer) and the remaining sources being a source model that encompasses all the other sources (e.g., various accompanying instruments). Defining more than two sources as two sources may reduce complexity by involving a smaller number of dictionaries and a simplified model structure.

Figure 4B:
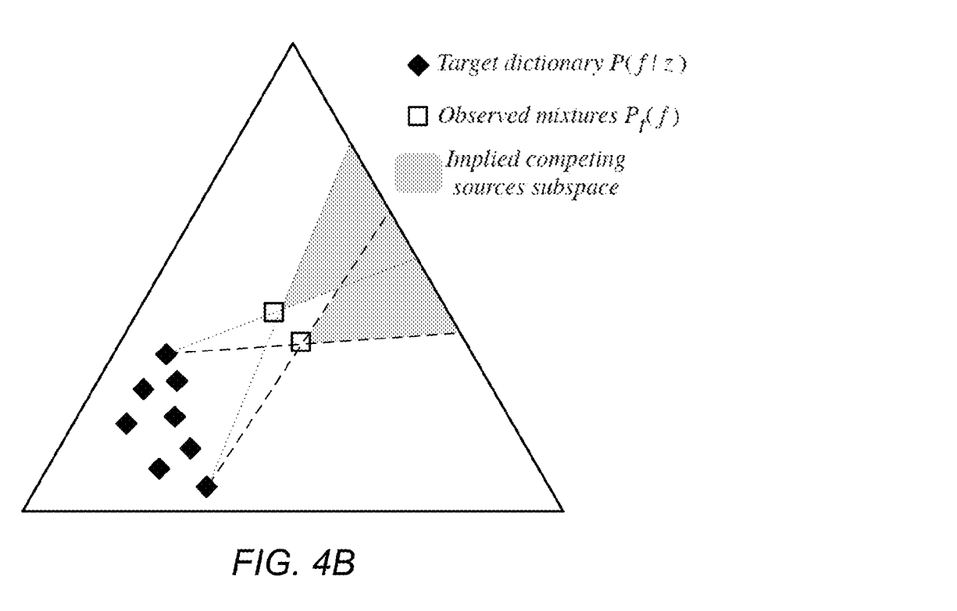
FIG. 4B illustrates an example of inferring a source's subspace given a target source and two mixture points, according to some embodiments.

Equation (3) assumes that training examples are available for each source observed in the sound mixture. In various embodiments, at least one source of the sound mixture may be unknown. As such, it may be assumed that the only dictionary elements that are known are the ones for the target source $P^{(a)}(f|z)$, whereas dictionary elements for the other sources may be unknown. The unknown source(s) may be referred to as non-target source(s). This means that not only may the weights be estimated for both the target and non-target sources but the dictionary elements of the non-target sources may also be estimated. The dictionary elements of the non-target sources may be modeled as a single source using the dictionary elements $P^{(b)}(f|z)$. In one embodiment, the only known parameters of the model may be $P^{(a)}(f|z)$, which may be set to be equal to the normalized spectra of the training data $\hat{S}_z^{(a)}(f)$. The Expectation-Maximization algorithm may then be applied to estimate $P^{(b)}(f|z)$, $P_t^{(a)}(z)$, and $P_t^{(b)}(z)$. The application of the EM algorithm may be iterative where the resulting estimation equations may be:

$$P_t(z, s | f) = \frac{P_t(s) P_t^{(s)}(z) P^{(s)}(f | z)}{\sum_{s'} P_t(s') \sum_{z'} P_t^{(s')}(z') P^{(s')}(f | z')} \quad \text{Eq. (4)}$$

$$P^{(b)*}(f | z) = \sum_t P_t(z, b | f) P_t(f) \quad \text{Eq. (5)}$$

$$P_t^{(a)*}(z) = \sum_f P_t(z, a | f) P_t(f) \quad \text{Eq. (6)}$$

$$P_t^{(b)*}(z) = \sum_f P_t(z, b | f) P_t(f) \quad \text{Eq. (7)}$$

$$P_t(a) = \frac{\sum_z P_t^{(a)*}(z)}{\sum_z P_t^{(a)*}(z) + \sum_z P_t^{(b)*}(z)} \quad \text{Eq. (8)}$$

$$P_t(b) = \frac{\sum_z P_t^{(b)*}(z)}{\sum_z P_t^{(a)*}(z) + \sum_z P_t^{(b)*}(z)} \quad \text{Eq. (9)}$$

where the * operator denotes an unnormalized parameter estimate and s is used as a source index. To obtain the current estimates of the parameters, they may be normalized to sum to 1 in each iteration. Equation (4) corresponds to the E-step of the EM algorithm, whereas Equations (5)-(9) corresponding to the M-step. The geometry of this process is illustrated in FIG. 4B. Given the training data for the target source, for every observed mixture input spectrum, a region may be inferred such that the plausible dictionary elements of the competing sources may lie in that region. This subspace may be defined by the two lines with the greatest possible angle between them, which connect two of the dictionary elements with the observed mixture point. This is because of the geometric constraint that the mixture of two points in the space lies on the line defined by these points. The union of all of these areas as inferred from multiple mixture points may define the space where the dictionary elements for the competing sources lie.

Turning back to FIG. 3, as shown at 330, at least one feature (e.g., pitch) may be estimated for one source (e.g., target source) of the sound mixture. The estimation may be based on the model received at 320 and may be constrained/refined based on temporal data (e.g., a semantic continuity constraint). In one embodiment, the estimation may be performed at each time frame of the sound mixture. In some embodiments, the estimations may be performed using a source separation algorithm (e.g., PLCA, NNMF, etc.).

Elaborating on the probabilistic decomposition model example above in which the training data is used directly as the dictionary elements for the source, the presence of a source as well as its pitch may be determined. Because the dictionary elements are used to explain the received sound mixture, prior tagging information from the training data may be used to infer semantic information about the mixture. In one embodiment, the energy of a source may be determined by using that source's prior (in the target's case, $P_t(a)$). To estimate the pitch of that source, a priori semantic tagging may be used. As described herein, normalized spectra from representative training data (e.g., recording(s)) of a source may be used to construct the target dictionary $P^{(a)}(f|z)$. The training data, being isolated (e.g., not mixtures), can be automatically pitch tagged such that each dictionary element has a pitch value associated with it. After analysis of a mixture, the set of priors $P_t(a)$ and weights $P_t^{(a)}(z)$ may be determined, which may then be combined to form an estimate of pitch across time by forming the distribution:

$$P_t^{(a)}(q) = \sum_{\{z : p^{(a)}(z) = q\}} P_t^{(a)}(z) \quad \text{Eq. (10)}$$

where $p^{(a)}(z)$ is the estimated pitch value associated with the dictionary element $P^{(a)}(f|z)$, and $P_t^{(a)}(q)$ denotes the probability that the target source has the pitch q at time t. The summation term may compute the sum of all the weights that are associated with each pitch value to derive a distribution for pitch.

In one embodiment, the estimate of $P_t^{(a)}(q)$ may be constrained according to a temporal data (e.g., a semantic continuity constraint). The temporal data may be temporal statistical information regarding the feature. Use of the semantic continuity constraint may reduce the impact of noisy estimates of $P_t^{(a)}(z)$ and therefore potentially less insightful estimates of $P_t^{(a)}(q)$. The semantic continuity constraint may produce sparse results with temporal smoothness constraints using a single constraint. Semantic continuity may be defined as having a minimal change (e.g., a limit on the difference) between estimates, $P_t^{(a)}(q)$, of successive time indices (e.g., frames). This means that sustained pitch values may be expected (e.g., as typically seen in music signals) and that large jumps in tracked melodies may not be expected (e.g., also as typically seen in music). Note that in other examples, a feature may be tracked that does have large changes from frame to frame. The temporal data used to constrain the feature estimate may reflect such expected large changes. The constraint based on the temporal data may be in the form of a transition matrix. The transition matrix may regulate the likelihood that, after seeing activity in dictionary elements associated with a specific pitch, activity in the next time period will be from dictionary elements that are associated with any other pitch. As described, the semantic continuity constraint may penalize large pitch jumps. Accordingly, in one embodiment, the transition matrix may be defined as:

$$P(z_{t+1}=i | z_t=j) \alpha e^{-\|p^{(a)}(z=i)-p^{(a)}(z=j)\|/\sigma} \quad \text{Eq. (11)}$$

where $P(z_{t+1}=i | z_t=j)$ denotes the probability that $P_{t+1}^{(a)}(z=i)$ will be active if $P_t^{(a)}(z=j)$ is active. In one embodiment, for simplicity, the normalizing factor that may ensure that $P(z_{t+1}=i | z_t=j)$ sums to 1 may be omitted. The two pitch values $p(z=i)$ and $p(z=j)$ may be the pitch tags associated with the two dictionary elements $P^{(a)}(f|z=i)$ and $P^{(a)}(f|z=j)$, respectively. The form of the matrix may impose an increased likelihood that, in subsequent estimates, more activity may be seen from dictionary elements that are associated with a pitch that is close to the pitch of the current dictionary elements. The constant $\sigma$ may regulate how important the pitch distance is in constructing the matrix.

The generated transition matrix may be incorporated into the learning process. As described herein, the weights $P_t^{(a)}(z)$ may be estimated at each iteration. Additionally, the estimates may be manipulated to impose the transition matrix structure. To do so, a forward-backward pass over the intermediate estimates may be performed, which may then be normalized.

For each estimated weights distribution, $P_t^{(a)}(z)$, there may be an expectation that it is proportional to $\Sigma_{z_t} P(z_{t+1}|z_t) P_t^{(a)}(z_t)$. This may be different from the estimate that is generated in the M-step; therefore, extra processing may be used to impose the expected structure on the current estimate. To do so, forward and backward terms are defined that may represent the expected estimates given a forward and a backward pass through $P_t^{(a)}(z)$:

$$F_{t+1}(z) = \sum_{z_t} P(z_{t+1} | z_t) P_t^{(a)}(z) \quad \text{Eq. (12)}$$

$$B_t(z) = \sum_{z_{t+1}} P(z_{t+1} | z_t) P_{t+1}^{(a)}(z) \quad \text{Eq. (13)}$$

The final value of $P_t^{(a)}(z)$ may be estimated as:

$$P_t^{(a)}(z) = \frac{P_t^{(a)*}(z)(C + F_t(z) + B_t(z))}{\sum_z P_t^{(a)*}(z)(C + F_t(z) + B_t(z))} \quad (14)$$

where $P_t^{(a)*}(z)$ is the estimate of $P_t^{(a)}(z)$ using the rule in Equation (6), and C is a parameter that controls the influence of the joint transition matrix. C may be mixture dependent, music dependent, dependent on the number of sources, or may be dependent on something else. As C tends to infinity, the effect of the forward and backward re-weighting terms becomes negligible, whereas as C tends to 0, the estimated $P_t^{(a)}(z)$ may be modulated by the predictions of the two terms $F_{t+1}(z)$ and $B_t(z)$, thereby imposing the expected structure. This re-weighting may be performed after the M-step in each EM iteration.

As a result of refining the weights estimates $P_t^{(a)}(z)$ based on the transition matrix, the pitch estimates $P_t^{(a)}(q)$ may likewise be refined, for example, by performing Equation (10) with the refined weights estimates.

In some embodiments, transition likelihoods may likewise be imposed for the non-target sources as well (e.g., as they relate to the target source). Accordingly, a transition matrix may be defined above that applies to each of the dictionary elements, corresponding to both target and non-target sources. Such a matrix may include four sections. One section may be as in Equation (11) that may regulate transitions between the dictionary elements of the target. Another section of the matrix may regulate the transition between the dictionary elements of the non-target sources. In one embodiment, each of the transition likelihoods between dictionary elements of non-target sources may be equiprobable. The remaining two sections may regulate transitions between target elements and non-target elements and vice versa. As one example, the transition likelihoods from non-target elements to target elements may be set to zero such that the structure of the target weights may not be perturbed by estimates of the non-target sources. The transition likelihoods from target elements to non-target elements may be set to a non-zero value to encourage more use of the non-target components to obtain a sparser representation for the target.

Using the transition matrix may take advantage of patterns of the target source. For example, for a given source, it may be determined that if, at time t, the pitch is 400 Hz, then the pitch at time t+1 will have a high probability of being 400 Hz, a high but lesser probability that the pitch will be 410 Hz, and a lesser probability the pitch with be 500 Hz. Using a transition matrix may leverage such information to create more precise pitch estimations.

In some embodiments, the estimating and constraining/refining of block 330 may be performed iteratively. For example, the estimating and constraining may be performed in multiple iterations of an EM algorithm. The iterations may continue for a certain number of iterations or until a convergence. A pitch may be converged when the change in pitch from one iteration to another is less than some threshold.

While much of FIG. 3 is described in terms of pitch and volume estimation, other features may likewise be estimated using similar techniques. For example, method 300 may be used to estimate a vowel that is uttered. In the vowel estimation example, the vowel values may be provided in the training data. Pitch and volume estimation are simply example applications of method 300.

Method 300 may provide accurate and robust pitch estimates of a source in a sound mixture even in situations in which at least one source is unknown. By using a semantic continuity constraint, energy from non-target components may be offloaded and in effect, act as a sparsity regularizer.

Figure 5A:
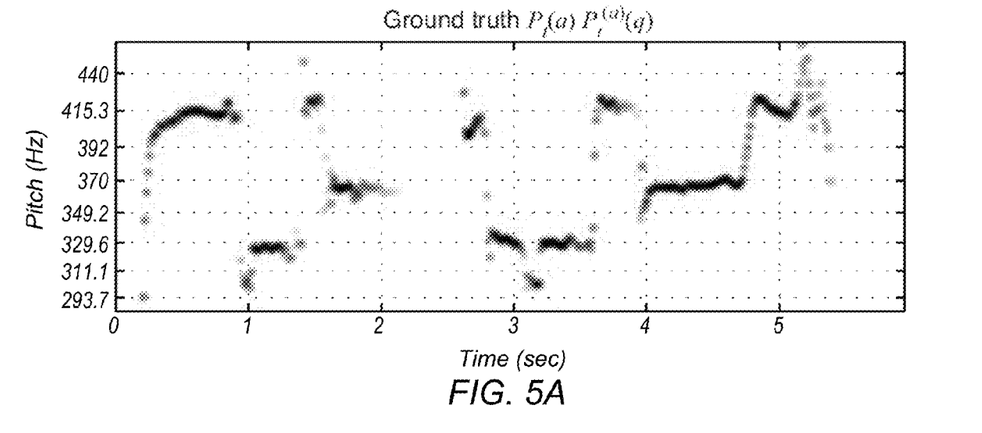
FIGS. 5A-5C illustrate example pitch/energy distributions for a segment of an example sound mixture, according to some embodiments.
Figure 5B:
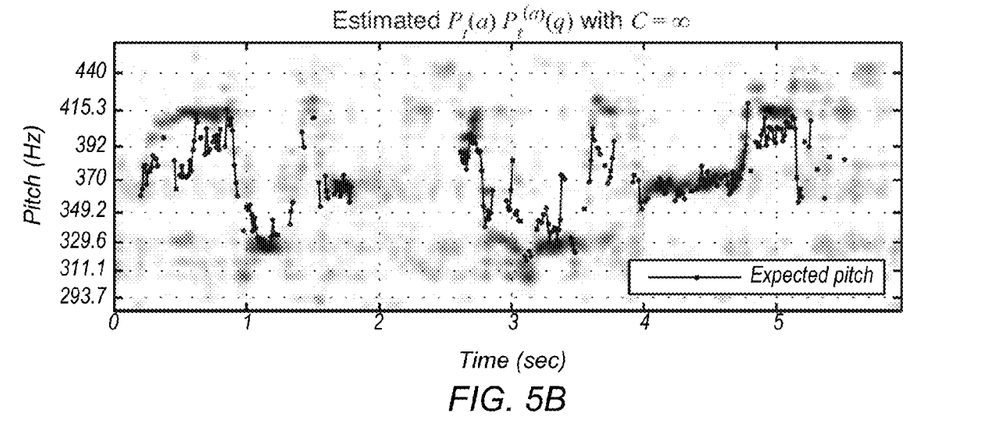
Figure 5C:
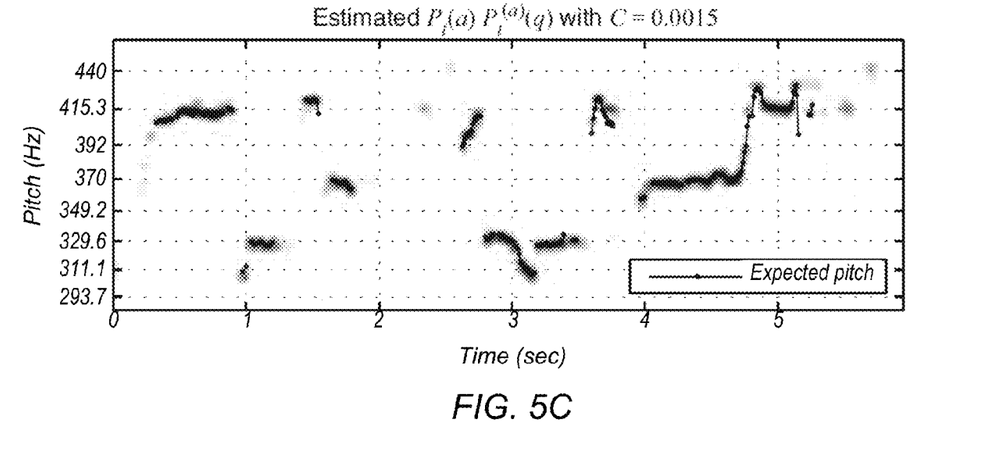

FIGS. 5A-5C illustrate example pitch/energy distributions for a segment an example song ("Message in a Bottle" by the Police). The target source was the lead vocal line by Sting. To train the system to focus on the target source, training data that included various recordings of String singing without any accompaniment was used. All audio recordings used a sample rate of 22,050 Hz. The training data was then pitched tracked and the target source dictionary $P^{(a)}(f|z)$ was constructed. The frequency transform that was used is the DFT with a window of 1024 pt and a hop size of 256 pt. The dictionary elements that were not pitched, or corresponded to parts with low energy were discarded resulting in a set of 1228 dictionary elements for Sting's voice. Four times as many components were used to describe all the competing sources. The demonstration was run twice, once with $C=\infty$ and once with $C=0.0015$ and $\sigma=10$. The transition probability from target to non-target components was set to 0.5.

In each of FIGS. 5A-5C, the pitch probability multiplied by the target prior (e.g., $P_t(a)/P_t^{(a)}(q)$) is displayed giving a sense of when the target was active and what the most likely pitch was. The darkness of the plot indicates the intensity/volume. The lines in FIGS. 5B and 5C show the expected pitch for each time point as estimated from the distributions. For ease of illustration, the illustrated distributions have been slightly blurred so that point probabilities are more visible. FIG. 5A shows the true distribution of the singer's voice. It is the ground truth of a roughly 6 second singing segment.

FIG. 5B shows the estimates in an embodiment not employing the semantic continuity constraint. In addition to the estimate of $P_t(a)P_t^{(a)}(q)$, the expected pitch was also plotted using $$\hat{p} = \sum_z P_t^{(a)}(z)p^{(a)}(z).$$

For regions where $P_t^{(a)}(z)$ was under the 50th percentile of its values, it was assumed that the source was inactive and that there was no pitch.

FIG. 5C shows the results when using the semantic continuity constraint. The resulting estimates are very close to the ground truth and result in robust pitch estimates. The use of the semantic constraint was able to offload irrelevant energy to the non-target components and acted as a sparsity regularizer.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the embodiments embrace all such modifications and changes and, accordingly, the above description to be regarded in an illustrative rather than a restrictive sense.

What is claimed is:

1. A method, comprising:
  receiving a sound mixture that includes a plurality of sources;
  receiving a model based on isolated training data for one source of the plurality of sources, the model including a dictionary of spectral basis vectors corresponding to the one source, the isolated training data being pitch tagged such that each of the spectral basis vectors of the dictionary of spectral basis vectors has an associated pitch value; and
  estimating at least a pitch feature for the one source in the sound mixture based on the model, said estimating constrained according to a constraint based on temporal data.

2. The method of claim 1, wherein the spectral basis vectors are normalized spectra from isolated training data of the one source.

3. The method of claim 1, wherein said estimating includes at least the pitch feature and an energy feature of the one source.

4. The method of claim 1, wherein at least one source of the plurality of sources is unknown such that no training data of the at least one unknown source is used to performed said estimating.

5. The method of claim 1, wherein the constraint is a semantic continuity constraint that includes a limit on a difference in the estimated feature in successive time frames of the sound mixture.

6. The method of claim 1, wherein the constraint is a transition matrix.

7. The method of claim 1, wherein said estimating is performed iteratively.

8. The method of claim 1, wherein said estimating is performed for each time frame of the sound mixture.

9. A non-transitory computer-readable storage medium storing program instructions, the program instructions computer-executable to implement:
  receiving a sound mixture that includes a plurality of sources;
  receiving a model for one source of the plurality of sources, the model including a dictionary of spectral basis vectors corresponding to the one source, the model based on isolated training data of the one source that is pitch tagged such that each of the spectral basis vectors of the dictionary of spectral basis vectors has an associated pitch value; and
  estimating at least a pitch feature for the one source in the sound mixture based on the model, said estimating constrained according to a constraint based on temporal data.

10. The non-transitory computer-readable storage medium of claim 9, wherein the spectral basis vectors are normalized spectra from isolated training data of the one source.

11. The non-transitory computer-readable storage medium of claim 9, wherein said estimating includes at least the pitch and an energy of the one source.

12. The non-transitory computer-readable storage medium of claim 9, wherein at least one source of the plurality of sources is unknown such that no training data of the at least one unknown source is used to performed said estimating.

13. The non-transitory computer-readable storage medium of claim 9, wherein the constraint is a semantic continuity constraint that includes a limit on a difference in the estimated feature in successive time frames of the sound mixture.

14. A system, comprising:
   at least one processor; and
   a memory comprising program instructions, the program instructions executable by the at least one processor to:
      receive a sound mixture that includes a plurality of sources;
      receive a model for one source of the plurality of sources, the model including a dictionary of spectral basis vectors corresponding to the one source, the model based on isolated training data of the one source that is pitch tagged such that each of the spectral basis vectors of the dictionary of spectral basis vectors has an associated pitch value; and
      estimate at least a pitch feature for the one source in the sound mixture based on the model, said estimating constrained according to temporal data.

15. The system of claim 14, wherein at least one source of the plurality of sources is unknown such that no training data of the at least one unknown source is used to performed said estimating.

16. The system of claim 14, wherein the constraint is a semantic continuity constraint that includes a limit on a difference in the estimated feature in successive time frames of the sound mixture.

17. The non-transitory computer-readable storage medium of claim 9, wherein the constraint is a transition matrix.

18. The non-transitory computer-readable storage medium of claim 9, wherein said estimating is performed iteratively and for each time frame of the sound mixture.

19. The system of claim 14, wherein the constraint is a transition matrix.

20. The system of claim 14, wherein said estimating is performed iteratively and for each time frame of the sound mixture.

* * * * *